United States Patent
Hanssen et al.

(10) Patent No.: US 8,850,307 B2
(45) Date of Patent: Sep. 30, 2014

(54) METHOD AND APPARATUS FOR RECEIVING DISPLAY LIMITED WEB PAGE CONTENT

(75) Inventors: Jan E. Hanssen, Sunnyvale, CA (US); Rajiv Kumar Vijayakumar, La Jolla, CA (US); Mark Bapst, South Barrington, IL (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 836 days.

(21) Appl. No.: 12/971,315

(22) Filed: Dec. 17, 2010

(65) Prior Publication Data

US 2012/0159311 A1 Jun. 21, 2012

(51) Int. Cl.
*G06F 17/00* (2006.01)
*G06F 17/30* (2006.01)
*H04L 29/08* (2006.01)

(52) U.S. Cl.
CPC ........ *G06F 17/30905* (2013.01); *H04L 67/322* (2013.01); *H04L 67/02* (2013.01)
USPC ............................ 715/238; 715/234; 715/243

(58) Field of Classification Search
CPC .......... G06F 17/30905; G06F 17/2247; G06F 17/30014
USPC .......................................... 715/234, 238, 243
See application file for complete search history.

(56) References Cited

U.S. PATENT DOCUMENTS

| | | | | |
|---|---|---|---|---|
| 6,657,647 B1* | 12/2003 | Bright | ........................... | 715/856 |
| 2006/0005137 A1* | 1/2006 | Jolley | ........................... | 715/742 |
| 2006/0047728 A1* | 3/2006 | Kim et al. | ..................... | 707/205 |
| 2008/0133722 A1* | 6/2008 | Ramasundaram et al. | ... | 709/222 |
| 2009/0070413 A1* | 3/2009 | Priyadarshan et al. | ....... | 709/203 |

* cited by examiner

*Primary Examiner* — Adam M Queler
(74) *Attorney, Agent, or Firm* — Neugeboren O'Dowd PC

(57) ABSTRACT

One embodiment comprises a non-transitory, tangible computer readable storage medium, encoded with processor readable instructions to perform a method of displaying content in a web page. One method optimizes the order of HTTP requests made during the downloading of a web page or web application comprising a plurality of objects, and receiving a first portion of the plurality of objects in a first order. Additionally, (i) a viewable section of the web page, (ii) centers of the viewable section of the web page and each of the plurality of objects, and (iii) a distance from the center of the viewable section of the web page to the center of each of the plurality of objects may be determined. Furthermore, the objects may then be prioritized based on their distance from the center of the viewable section. A request to receive at least one additional portion of the objects in a second order based on the prioritization of the objects may then be sent.

23 Claims, 6 Drawing Sheets

METHOD AND APPARATUS FOR RECEIVING DISPLAY LIMITED WEB PAGE CONTENT

FIELD OF THE INVENTION

The present invention relates to receiving web content, including web pages and web applications. In particular, but not by way of limitation, the present invention relates to apparatus and methods for optimizing the order in which webpage content is received.

BACKGROUND OF THE INVENTION

Hypertext Transfer Protocol (HTTP) is a foundational application layer data communication protocol that has helped enable the proliferation of the World Wide Web. More specifically, HTTP is a networking protocol adapted to be used across information systems between a client and server, functioning as a request-response protocol. In HTTP, a web browser, for example, acts as a client, while an application running on a computer hosting a web site functions as a server. The client submits an HTTP request message to the server and the server returns a response message to the client. The response message may contain content requested by the client. Such content may include content stored on the server such as HyperText Markup Language (HTML) files, images, content generated on the fly, or may comprise performing functions on behalf of the client. The client may then send additional HTTP request messages to the server, requesting to receive various objects and files that may be referenced within the original response.

The order in which the additional HTTP messages requesting objects from the web server are sent from the client may be set by the order in which they are encountered by the browser. In such a scenario, the client may request objects that may not be immediately displayable on an electronic display as the objects may not be located in the portion of the web page that is currently being viewed on the client device electronic display.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One embodiment of the invention may be characterized as a non-transitory, tangible computer readable storage medium, encoded with processor readable instructions to perform a method of displaying content in a web page. The method may comprise sending a request from a web browser client to view a web page, wherein the webpage comprises a plurality of objects and is hosted, or stored, on a web page host. The client then receives a first portion of the plurality of objects from the web page host. The order in which the first portion of the plurality of objects is received by the client comprises a first order. During the time the first portion of the plurality of objects is received, a viewable section of the web page may be determined, and a center of the viewable section of the web page may be calculated, along with calculating a center of each of the plurality of objects. A distance from the center of the viewable section of the web page to the center of each of the plurality of objects may then be calculated. The plurality of objects are then prioritized based on their distance from the center of the viewable section of the web page, and, a request to receive a second portion of objects in an order based on the prioritization of the plurality of objects is sent to the web page host.

Another embodiment of the invention may be characterized as a mobile computing device that includes processing components, memory components, an electronic display, and a web browser adapted to communicate with a web server. The web browser may be adapted to communicate with a web server by requesting to view a web page that comprises a plurality of objects. Furthermore, the web browser may receive a first portion of the plurality of objects in a first order from the web server. While the web browser requests and receives the first portion of the plurality of objects, a section of the web page that is displayed on the electronic display may be determined and a distance from a center of the section of the web page that is displayed on the electronic display to a center of each of the plurality of objects may be calculated. A list of the plurality of objects may then be created comprising the distance of the center of each of the plurality of objects from the center of the section of the web page that is displayed on the electronic display. The list may then be stored in the memory components and another request may be sent to receive a second portion of objects in a second order.

Yet another embodiment of the invention may be characterized as a mobile computing apparatus. One mobile computing apparatus includes means for receiving a first portion of a plurality of viewable objects in a first order, means for determining a viewable area of a web page on a mobile computing device electronic display, and means for determining a distance from a center of the viewable area of the web page on the mobile computing device electronic display to a center of each of the plurality of viewable objects. The mobile computing apparatus also includes means for listing the objects in a second order corresponding to the distance of the center of each of the plurality of viewable objects from the center of the viewable area of the web page on the mobile computing device electronic display and sending at least one request to receive at least one additional portion of the plurality of viewable objects in a second order.

And another embodiment of the invention may be characterized as a method of requesting a plurality of objects from a web server. One method in this embodiment comprises receiving a first portion of the plurality of objects from the web server. A viewable area of a web page is determined, a center of the viewable area is calculated, and a distance from the center of the viewable area to a center of each of the objects is measured. A sortable list comprising the distance from the center of each of the plurality of viewable objects to the center of the viewable area is created. Then, a second group of objects are requested from the web server in the order of the sortable list.

BRIEF DESCRIPTION ON THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

DETAILED DESCRIPTION

Figure 1:
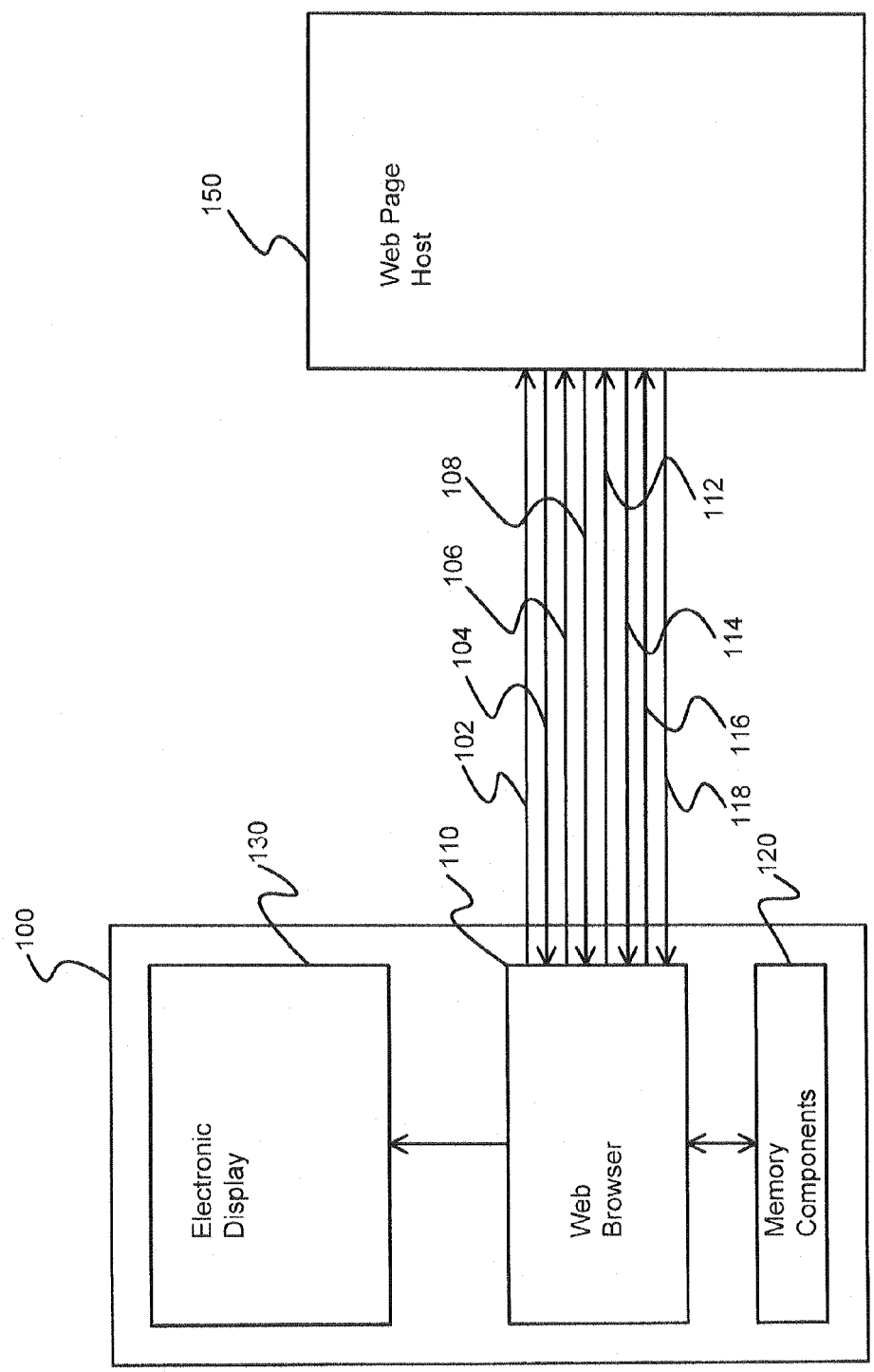
FIG. 1 illustrates a block diagram depicting the communication between the web browser, electronic display, memory components, and web page host of an exemplary embodiment of the invention.
Figure 2:
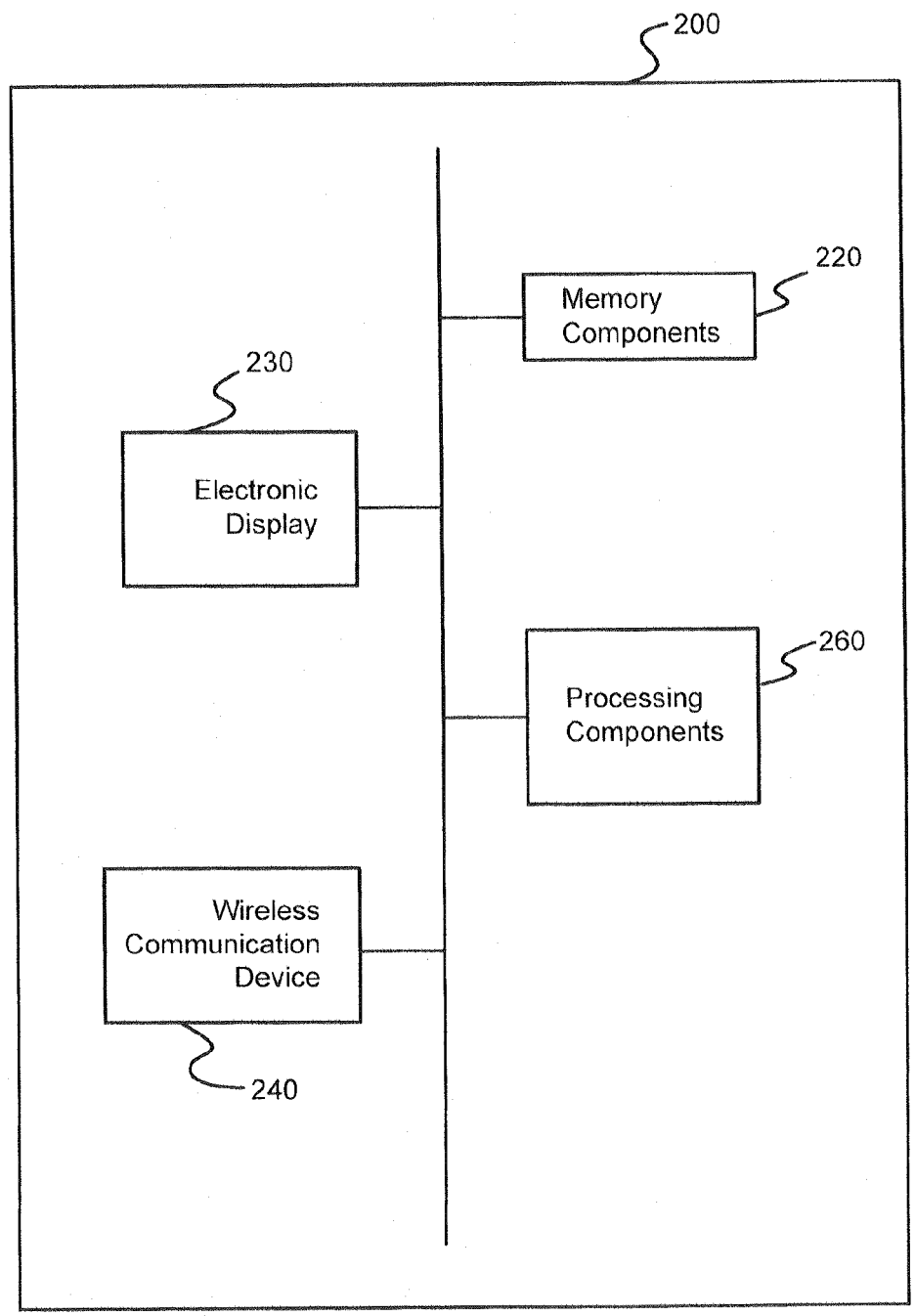
FIG. 2 illustrates a block diagram depicting physical components of an exemplary embodiment of the present invention.

Referring first to FIG. 1, shown is a block diagram depicting the communication between a mobile computing device 100 comprising a web browser 110 and a web page host 150. The mobile computing device 100 may comprise memory components 120 comprising a non-transitory and tangible computer-readable storage medium that is encoded with processor readable instructions adapted to operate the web browser 110. Such instructions may comprise one or more of software, firmware, and/or hardware which, as seen in FIG. 2, are adapted to display content in a web page on an electronic display 130. The electronic display 130 may be known in the art as a viewport and may be referenced herein as such. In addition to displaying content on the web page, the method may further comprise downloading and rendering the content.

In one embodiment, a user of the mobile computing device 100 may access an application comprising the web browser 110 on the mobile computing device 100. It is to be appreciated that although the web browser 110 is described throughout the present application as being a portion of a mobile computing device 100, the web browser 110 may also be comprised as a portion of a non-mobile computing device such as, but not limited to, a desk-top computer. Furthermore, the web browser 110 may also be described herein as a client or as a web browser client. Additionally, although the web browser 110 may be described as taking actions such as, but not limited to, sending a request 102 to a web page host 150 to view a web page, a person of ordinary skill in the art may appreciate that other hardware, software, and/or firmware devices individually and/or in conjunction with the web browser 110 may perform such actions. For ease of description, however, such actions will be described as being taken by the web browser 110, unless specifically directed otherwise.

Figure 4:
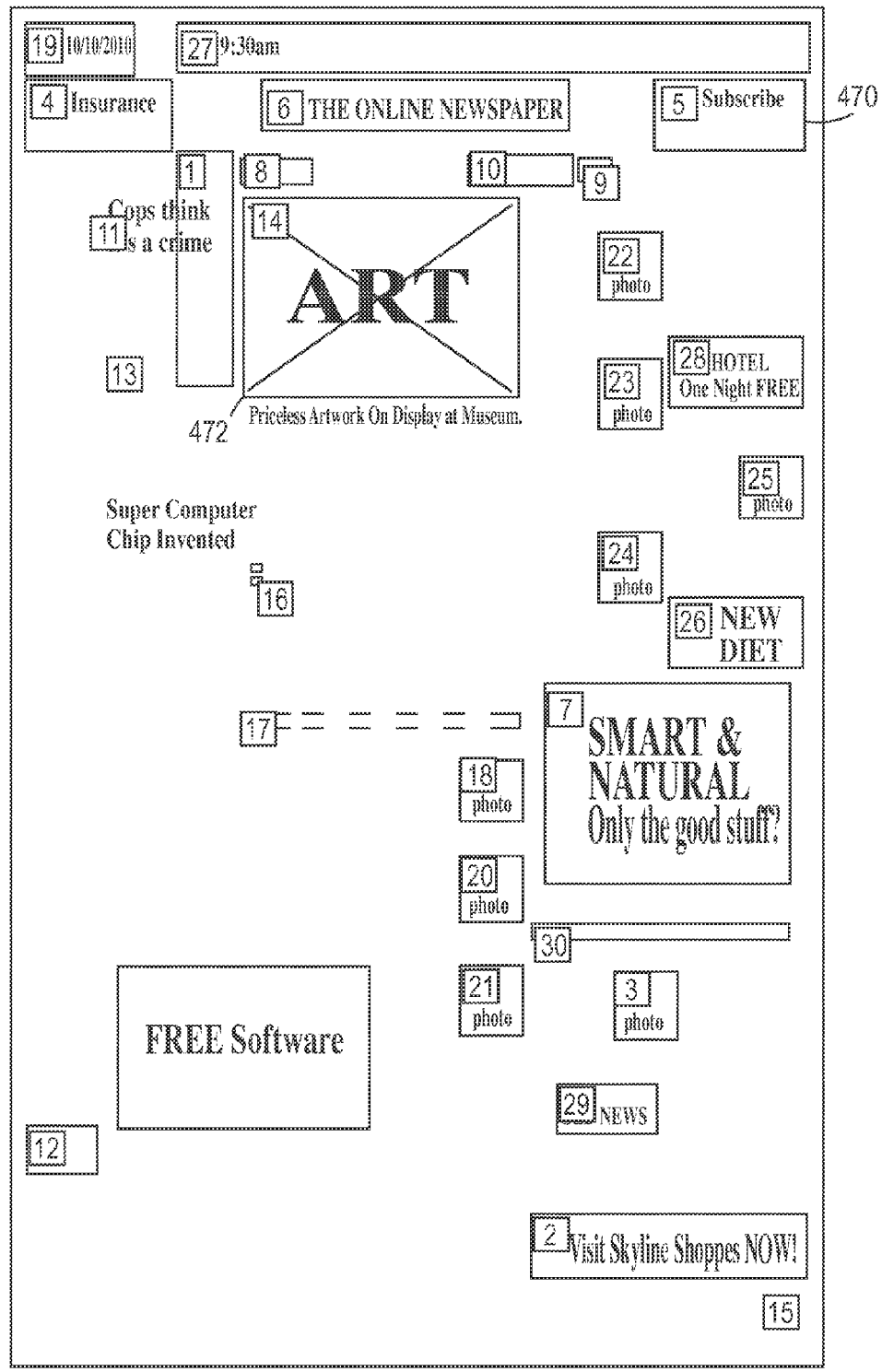
FIG. 4 illustrates a web page comprising a plurality of objects in connection with the embodiments described herein.

One request 102 to view a web page may comprise a request 102 to view a web page comprising a plurality of objects. The objects may comprise viewable objects. Additionally, please note that throughout the application, the term "viewable objects" may be used interchangeably with the term "objects", unless specifically designated otherwise. Seen in FIG. 4 is one example of a web page 470. The FIG. 4 web page 470 is comprised of a plurality of objects 472. Each of the plurality of objects 472 may comprise a portion of the web page 470. FIG. 4 also comprises a sequentially increasing number from one to thirty assigned to each of the objects 472, respectively. This sequentially increasing number will be explained below.

The web page host 150 seen in FIG. 1 may comprise a web server in one embodiment. However, the web page host 150 may comprise more than one device—such as, but not limited to, a server and a storage device. Additionally, the web page host 150 could simply be local storage which contains a local copy of the web page 470 objects 472.

In one embodiment, the request 102 may be sent by the web browser 110 upon a user selecting a Uniform Resource Locator (URL). The request may comprise a HTTP message. Furthermore, it is contemplated that the request 102 is made via a communications systems such as, but not limited to, a wireless communications system and comprising protocols known to a person of ordinary skill in the art.

In response to the request 102 to view the web page 470, the web page host 150 may send a reply 104 to the mobile computing device 100. One reply 104 may comprise an HTTP response comprising the web page 470. For example, HTML data comprising the web page 470 may be sent to the mobile computing device 100. The web page 470 may also comprise other computing languages besides HTML.

In one embodiment, the web page 470 data sent to the web browser 110 references the viewable objects 472. As the web browser 110 reads the data from the reply 104, upon encountering the viewable objects 472, the web browser 110 may send one or more additional requests 106 requesting to receive the referenced objects 472. The web page host 150 may provide at least one additional reply 108. The additional requests 106 and the at least one additional reply 108 may comprise a plurality of additional requests 106 and additional replies 108 that may comprise HTTP requests and responses. Furthermore, each additional request 106 for an object 472 may elicit a corresponding additional reply 108 supplying the object 472. Requests 106 can be sent in parallel across multiple TCP sockets or they can be queued up and pipelined across one socket or both parallel and pipelining methods can be combined.

In one embodiment, the at least one additional reply 108 comprises a first portion of viewable objects 472. In one embodiment, the viewable objects 472 comprise separate digital files such as, but not limited to, JPEG files that reside on the web page host 150 or another location. The first portion of viewable objects 472 may be provided to the web browser 110 in a first order. For example, the first portion of viewable objects 472 may be provided in a first order comprising the order in which the viewable objects 472 are encountered within the web page 470 (and subsequently requested) by the web browser 110. In one embodiment, the number associated with each viewable object 472 in FIG. 4 may reflect the order in which that particular viewable object is listed in the HTML and requested to be sent from the web page host 150 to the mobile computing device 100 in a typical client/server HTTP request/response sequence. Therefore, in the request of the web page seen in FIG. 4, the object 472 associated with the number one is the first object 472 to be requested in the one or more additional requests 106 and sent in the at least one additional reply 108. The number two is associated with the second object 472 requested and sent as a result of the request, and so on. As seen, the order in which the objects 472 may be referenced within the HTML, and then requested and received by the web browser 110, may not have any relationship to the object's 472 physical location in the web page 470.

In one embodiment, upon receiving a first object 472 from the plurality of objects 472, the web browser 110 uses the first object 472 to build a Document Object Model (DOM) tree.

The DOM tree identifies the plurality of objects 472 and their relationship to one another. The DOM tree is continually updated as the web browser 110 continues to receive the first portion of the plurality of objects 472. A Render Tree may also be created from the DOM tree which identifies the relative position and style of all of the objects 472 in the web page 470. While the Render Tree is being created, the one or more additional requests 106 and the at least one additional reply 108 may be sent and received. Typically, Cascaded Style Sheets (CSS) are the first objects 472 that may be requested as CSS often determine the overall layout and style of the web page 470. One or more first portion of objects 472 may also comprise a JavaScript object 472 adapted to be downloaded, executed, and may reference other JavaScript objects 472 or other objects 472 such as, but not limited to, images.

Figure 3:
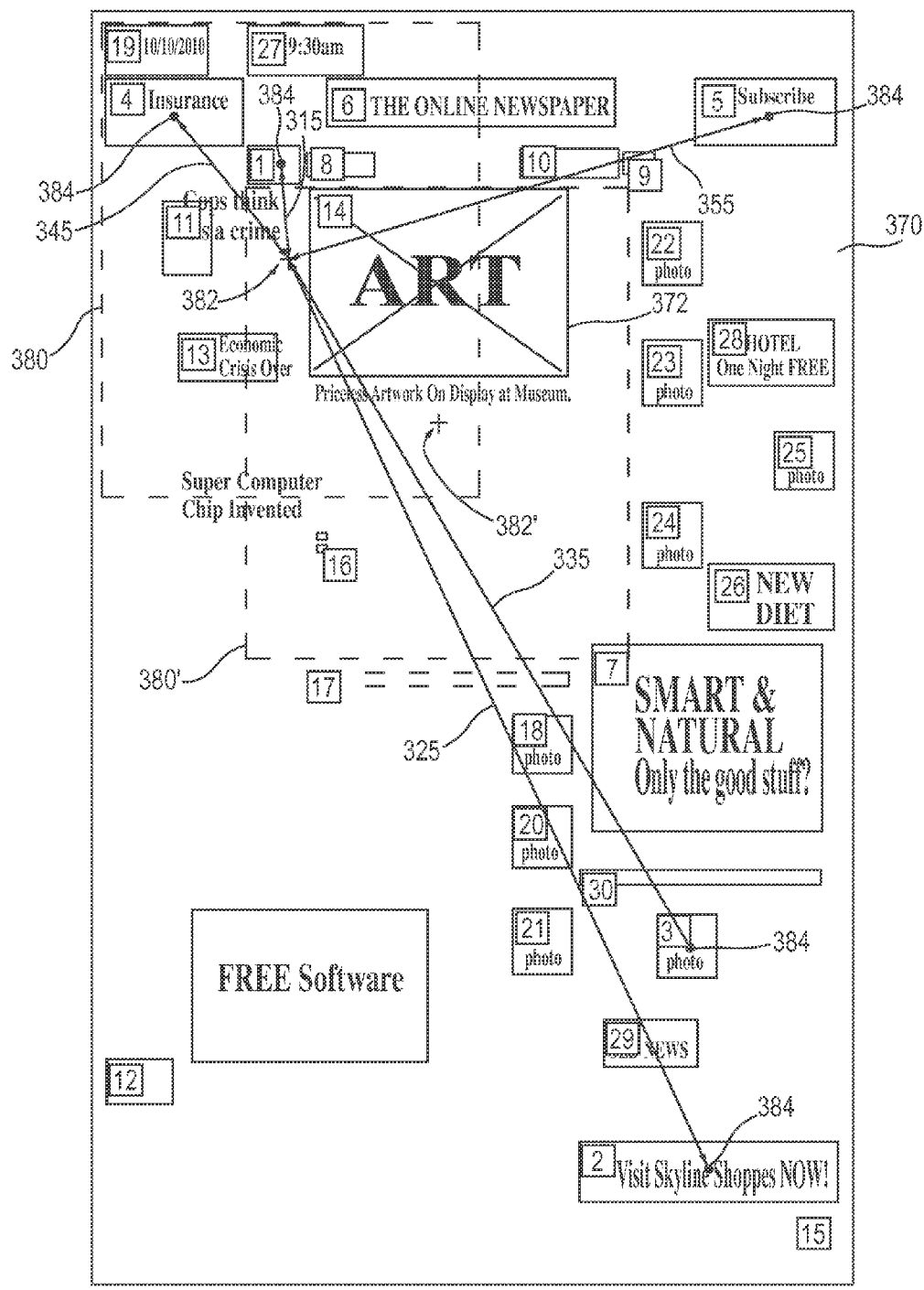
FIG. 3 illustrates a web page comprising a plurality of objects and a viewable area of the web page moving to a new viewable area in connection with the embodiments described herein.

In one embodiment, as the first portion of the viewable objects 472 are being requested 106 and received 108 by the web browser 110 in the first order, the web browser 110 may also be calculating what portion of the web page 470 to display on the electronic display 130. Seen in FIG. 3 is one example of a calculated viewable area 380 of the web page 370 that is displayed on the electronic display 130. The viewable area 380 may be determined from the Render Tree. As the viewable area 380 of the web page 370 is determined, a center 382 of the viewable area 380 and a center 384 of each of the plurality of viewable objects 372 are also determined. Upon determining the center 384 of each of the plurality of viewable objects 372 as well as determining the center 382 of the viewable area 380, distances between the center 384 of each of the viewable objects 372 and the center 382 of the viewable area 380 are determined. For example, shown in the web page 370 are the distances between the center 382 of the viewable area 380 and the centers 384 of each of the viewable objects 372 associated with the numbers one through five.

In one embodiment, the viewable objects 372 associated with the numbers one through five may comprise the first portion of viewable objects 372. Therefore, distance 315 is the distance between the center 384 associated with the first received viewable object 372 and the center 382 of the viewable area 380, distance 325 is the distance between the center 384 of the second received viewable object 372 and the center 382 of the viewable area 380, distance 335 is the distance between the center 384 of the third received viewable object 372 and the center 382 of the viewable area 380, distance 345 is the distance between the center 384 of the fourth received viewable object 372 and the center 382 of the viewable area 380, and distance 355 is the distance between the center of the fifth received viewable object 372 and the center 382 of the viewable area 380. As seen, objects two, three, and five are outside the boundary of the viewable area 380 and are therefore requested and received even though they will not be immediately displayed on the electronic display 130.

Therefore, in order to optimize the receipt of the viewable objects 372 such that the remaining un-received objects 372 inside the viewable area 380 of the web page 370 are requested and received prior to any un-received objects 372 outside of the viewable area 380, when the web browser 110 is finished performing the distance calculations for the plurality of viewable objects 372, the plurality of viewable objects 372 are prioritized in an order based on their distance from the center 382 of the viewable area 380. A list comprising the objects 372 prioritized in such a manner may then be created and saved to the memory components 120 of the mobile computing device 100. One list may comprise the Render Tree. Other methods and apparatus known in the art besides saving a list to the memory components 120 may also be implemented to ensure the object 372 prioritization is saved. Other embodiments may prioritize the objects 372 in a different manner not incorporating the center 382 of the viewable area 380 or the center 384 of the objects 372. For example, distances from a first location of an object such, but not limited to, a left-most edge of an object 372 to a first location of the viewable area such as, but not limited to, the right-most edge of the viewable area may be used to prioritize the objects 372. Additionally, it is contemplated to organize the prioritization of objects 372 based on object 372 type or based on content. For example, all advertisements may be requested last, regardless of their location in the web page 370.

When the distance calculations are complete and the object 372 prioritizations are made, one or more new requests 112 are made for the viewable objects 372 that were not requested prior to the calculations and prioritizations being completed. Therefore, the one or more new requests 112 are for a second portion of the plurality of objects 372 while the one or more additional requests 106 were for the first portion of the plurality of objects 372. In FIG. 3, the second portion of viewable objects 372 comprises the un-received objects corresponding to numbers six through thirty. Unlike the first portion of viewable objects 372, the order in which the second portion of viewable objects 372 is requested does not depend upon the order that the viewable objects 372 are encountered by the web browser 110. The order in which the second portion of viewable objects 372 is requested comprises a second order corresponding to the prioritization of the plurality of viewable objects 372 based on their distance from the center 382 of the viewable area 380. In one embodiment, the object 372 that is located closest to, and that comprises a center 384 that is the shortest distance from, the center 382 of the viewable area 380 is requested first, and each subsequently requested object 372 comprises a center 384 that is located a distance from the center 382 of the viewable area 380 that is greater than or equal to the distance between the center 384 of each previously requested object 372 and the center 382 of the viewable area 380. Therefore, the objects 372 in the viewable area 380 of the web page 370 are generally requested before the objects 372 outside of the viewable area 380 of the web page 370. By requesting the un-received objects 372 inside the viewable area 380 before the un-received objects 372 outside of the viewable area 380, the viewable area 380 is rendered more quickly than if all the objects 372 are requested and rendered in the first order. In FIG. 3, the second portion of viewable objects 372 that are located in the viewable area 380 may be prioritized and requested in the following order: eight, eleven, thirteen, fourteen, six, twenty-seven, and nineteen. The un-requested viewable objects 372 located outside the viewable area 380 are also requested in the order of their distance from the center 382 of the viewable area 380.

The one or more new requests 112 may comprise a plurality of requests 112 where each new request 112 comprises a request to receive an object 372 comprising one of the un-received second portion of objects 372 corresponding to the numbers six through thirty in FIG. 3. In one embodiment, the object 372 closest to the center 382 of the viewable area 380 of the web page 370 is requested before any other objects comprising the second portion of objects 372. Each next closest object 372 to the center 382 of the viewable area 380 of the web page 370 is then requested 112 after the previous object 372 is requested. In one embodiment, the second portion of the plurality of objects 372 is received from the web page host 150 through one or more new replies 114 in the second order based on the prioritization of the plurality of objects 372.

In one embodiment, at least one object 372 from the second portion of the plurality of objects 372 may comprise a dynamic object 372. One type of dynamic object 372 may reference at least one additional object 372. Such an additional object 372 may be referred to as a dependent object, since the first object 372 needs to be requested, downloaded and executed before it can be determined that the second object 372 needs to be requested. The at least one additional object 372 may also be referred to as another object 372. One dynamic object 372 may comprise a JavaScript object 372. Other dynamic executable objects 372 are also contemplated. In one embodiment, the dynamic object 372 may also be received in the first portion, or any other portion, of the plurality of objects 372. Upon executing the script, and determining that the dynamic object 372 references at least one additional object 372, the web browser 110 may determine a center 384 of the at least one additional object 372 and calculate a distance from the center 382 of the viewable area 380 of the web page 370 to the center 384 of at least one additional object 372. The web browser 110 may also re-prioritize the plurality of objects 372, including the at least one additional object 372, based on their distance from the center 382 of the viewable area 380 of the web page 370. Thereupon, one or more further requests 116 may be sent from the web browser 110 to the web host 150 to receive a third portion of the plurality of objects 372. One third portion of the plurality of objects comprises any objects 372 not received in the first portion and second portion prior to the re-prioritization of the objects 372 upon determining that a dynamic object 372 references at least one additional object 372. The third portion may comprise the at least one additional object 372. In response to the one or more further requests 116, at least one further response 118 is provided to the web browser 110, with the at least one further response 118 comprising the third portion of the plurality of objects 372. It is to be appreciated that dynamic objects 372 may also be received in any portion of the plurality of objects. Therefore, one or more additional portions of plurality of objects may be requested.

The one or more further requests 116 and at least one further response 118 may also be issued when the viewable area 380 of the web page 370 is changed. For example, as seen in FIG. 3, a user of a device may change the viewable area 380 to a new viewable area 380'. A new viewable area 380' may occur through scrolling, panning, zooming, or changing the viewable area 380 from a portrait orientation to a landscape orientation. Upon changing the viewable area 380 to the new viewable area 380', distances from a center 382' of the new viewable area 380' to the center 384 of each of the plurality of objects 372 are dynamically calculated and the plurality of objects 372 are dynamically prioritized based on their distance from the center 382' of the new viewable area 380'. In one embodiment, when the change to the new viewable area 380' occurs prior to receiving all of the objects 372 in the second portion of viewable objects, the one or more further requests 116 and the at least one further response 118 are needed. The one or more further requests 116 of objects 372 can be based on the prioritization of the objects 372 based on the updated distance calculations to the new viewable area. However, when the change to the second viewable area 380' occurs after receiving all of the objects 372 the one or more further requests 116 and the at least one further response 118 may not be required. In either case, however, the order which the objects 372 are rendered by the Processing Components 260 may be prioritized based on the second viewable area 380'. The request order and the rendering order do not have to be the same since the requested objects 372 are stored in Memory Components 120 once they are received.

Moving on to FIG. 2, seen is a block diagram of one embodiment of the invention comprising a mobile computing device 200. One mobile computing device 200 comprises memory components 220, an electronic display 230, and the web browser 110 seen in FIG. 1. The mobile computing device 200 may also comprise a wireless communications device 240 such as an antenna, and one or more processing components 260. In one embodiment, the web browser 110 is adapted to communicate with a web server 150 in a manner described with respect to FIGS. 1, 3, and 4. For example, the web browser 110 may request to view a web page 370 comprising a plurality of objects 372, receive a first portion of the plurality of objects 372 in a first order, determine a section of the web page 370 that is displayed on the electronic display 230—such as the viewable area 380, calculate a distance from the center 382 of the section of the web page 370 that is displayed on the electronic display 230 to a center 384 of each of the plurality of objects 372, and create a list of the plurality of objects 372 based on their distance from the center 382 of the section of the web page 370 displayed on the electronic display 230. The web browser 110 may be further adapted to store the list in the memory components 220 and, upon completion of the list, request to receive a second portion of objects 372 from the web server 150 in a second order. In one second order, any objects 372 not requested and received in the first portion of objects 372 are requested to be received in the order that they are provided in the list. One list may comprise ranking the plurality of objects 372 in the order of the distance of the center 384 of each of the plurality of objects 372 from the center 382 of the section of the web page 370 that is displayed on the electronic display 230.

The web browser 110 in the mobile computing device 200 of FIG. 2 may also be adapted to receive the objects 372 not received in the first portion of the plurality of objects 372, in the second order. Furthermore, at least one of the second portion of objects 372 may comprise a dynamic viewable object 372 referencing at least one additional object 372. As described previously, a center 384 of the at least one additional object 372 may be determined and a distance may be calculated from the center 382 of the section of the web page 370 that is displayed on the electronic display 230 to the center 384 of at least one additional object 372. Furthermore, the plurality of objects 372 including the at least one additional object 372 may be re-prioritized based on their distance from the center 382 of the section of the web page 370 that is displayed on the electronic display 230. Upon completion of the re-prioritization, the web browser 110 requests to receive a third portion of objects 372 comprising any objects 372 that have not been requested in the second portion of the plurality of objects 372 by the time the re-prioritization is complete. In this manner, if the at least one additional object 372 is closer to the center 382 of the viewable area 380, the at least one additional object 372 may be requested and received prior to any objects 372 located a greater distance from the center 382 of the viewable area 380. The order in which the third portion of objects 372 is requested may correspond to the re-prioritization of the objects. In addition to re-prioritizing (aka, updating) the list, upon determining that the web page 370 comprises at least one additional object 372, the web browser 110 may also be adapted to update the list of the plurality of objects 372 upon changing the section of the web page 370 that is displayed on the electronic display 230 to a new viewable area 380'. Furthermore, the web browser 110 also may be adapted to communicate with a web server 150 by requesting to receive any un-sent objects 372 in an order corresponding to the updated list of the plurality of objects. The web browser 110 of the mobile computing device 200 is further adapted to communicate with the web server 150 by recalculating the distance from the center 382 of the section of the web page 370 displayed on the electronic display 230 to the center 384 of each of the plurality of objects 372 upon changing the section of the web page 370 displayed on the electronic display 230 to the new viewable area 380' comprising at least in part a separate portion of the web page 370 than comprises the viewable area 380. Furthermore, the one or more further requests 116 may comprise at least one request to receive at least one additional portion of the plurality of viewable objects 372 and may comprise an HTTP request. Additionally, in the list of the plurality of objects 372, the list may be sorted by object 372 distance from the viewable area 380 where a first entry provided in the list comprises a reference to an object 372 having a shortest distance from the center 382' of the new viewable area 380' and each successively listed object 372 comprises an object having a distance from the center 382' of the new viewable area 380' that is one of the same as and greater than each previously listed object.

Figure 5:
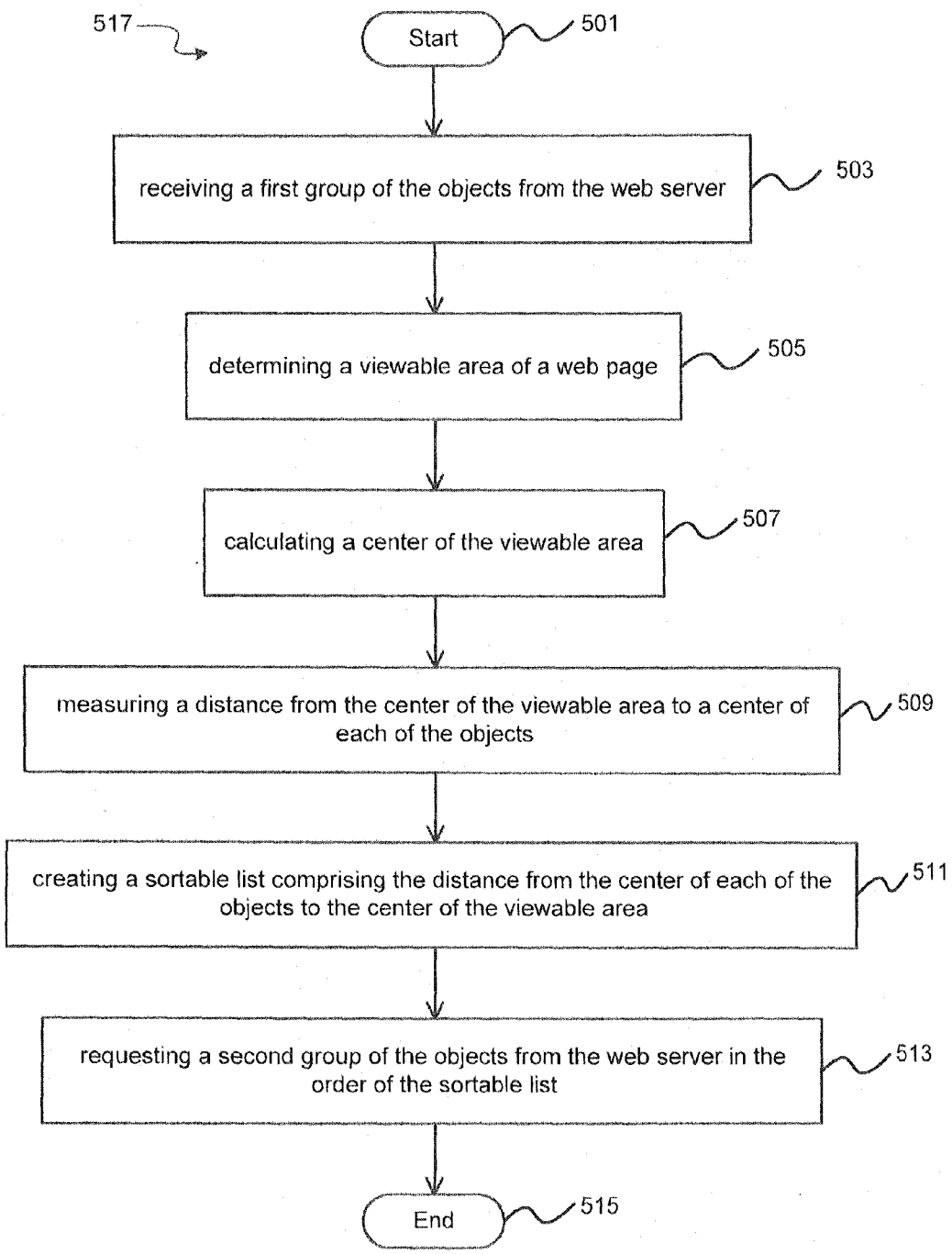
FIG. 5 illustrates a flowchart that depicts a method that may be carried out in connection with the embodiments described herein.
Figure 6:
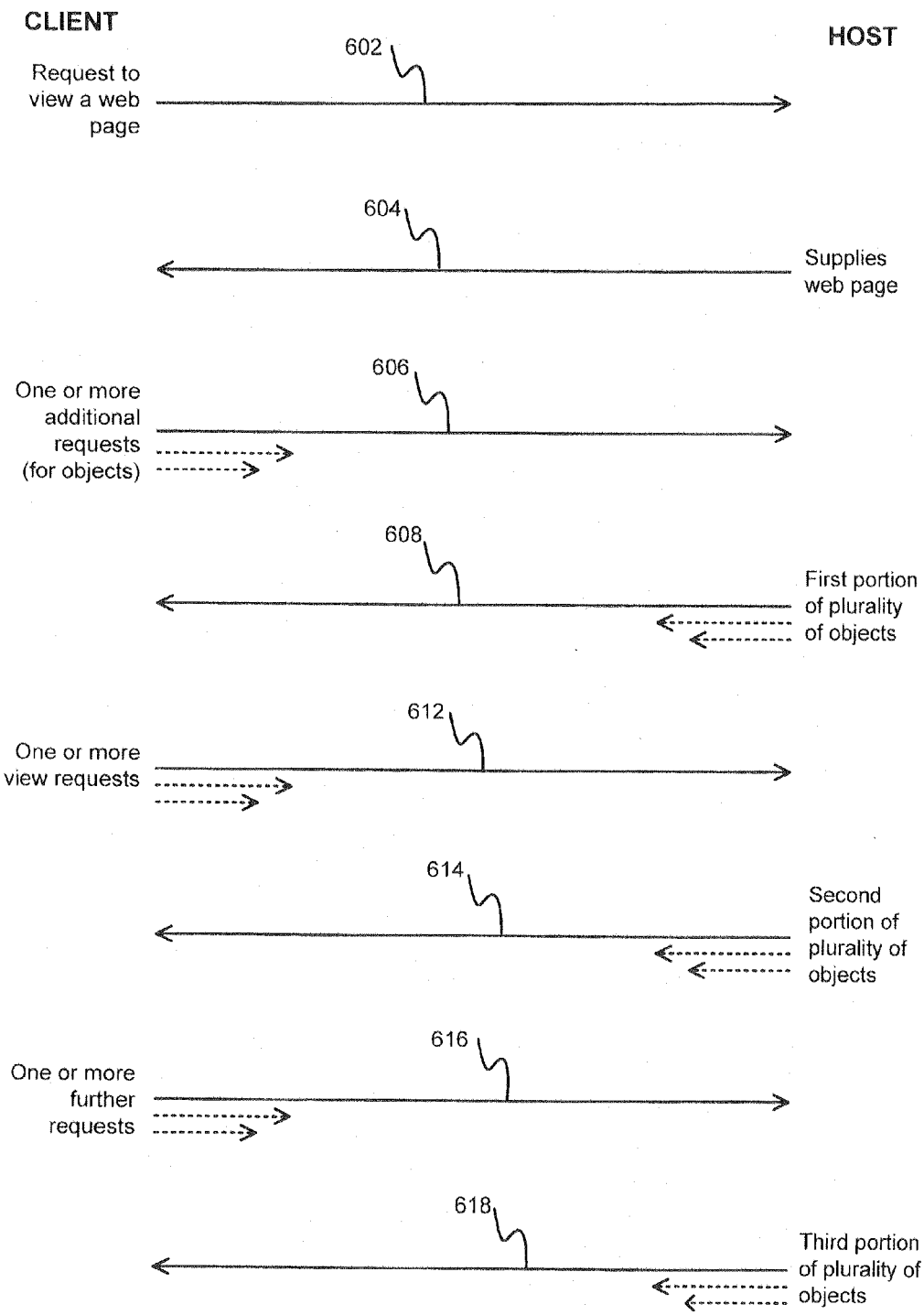
FIG. 6 illustrates the communication between the client and the host in an exemplary embodiment of the invention.

Moving on now to FIGS. 5 and 6, seen is a method 517 of requesting a plurality of objects from a web server. One web server may comprise the web page host 150 seen in FIG. 1. Furthermore, the objects may comprise objects 372, 472 see in FIGS. 3 and 4. The method starts at 501. At 503, one method comprises receiving a first portion of objects that may be received from the web server in the at least one additional reply 608. Similar to the description above with regard to FIGS. 1-4, in one method, at 505, the method further comprises determining a viewable area 380 of a web page 370, at 507, calculating a center 382 of the viewable area 380, and at 509, measuring a distance from the center 382 of the viewable area 380 to a center 384 of each of the objects 372. It is contemplated that receiving the first portion of viewable object may occur in parallel with (i) determining a viewable area 380, (ii) calculating the center of the viewable area 380, and/or (iii) measuring a distance from the center of the objects to the center of the viewable area 380. Furthermore, one method also comprises at 511, creating a sortable list comprising the distance from the center 384 of each of the objects 372 to the center 382 of the viewable area 380, and at 513 requesting a second portion of the objects 372 from the web server in the order of the sortable list. Although throughout the application, requesting the second portion of the objects may be described, shown, and alluded to as a single step, it is well understood that the second portion of the objects is actually a recursive process that can go on indefinitely, repeating in a loop until there are no more dependent objects discovered. Such a process is shown in FIG. 6, where one or more further requests 616 are shown. The method may end at 515. The mobile computing device may request the second portion of objects 372 in one or more new requests 612.

Requesting the second portion of the plurality of objects 372 may comprise first requesting an object 372 having the shortest distance from the center 382 of the viewable area 380 to the center 384 of the object 372 requested out of all of the plurality of objects 372 that were not received in the first portion of the plurality of objects. Furthermore, in one method, the center 384 of each successively requested object 372 after the first requested object 372 comprises one of a greater than and an equal to distance from the center 382 of the viewable area 380 as compared to each previously requested object 372.

One method may also comprise changing a viewable area 380 of the web page 370 to a new viewable area 380', as seen in FIG. 3. Upon changing the viewable area 380 to the new viewable area 380', the location of the center 382 of the viewable area 380 may be recalculated to a new center 382' of the new viewable area 380'. The distance from the center 382' of the new viewable area 380' to the center 384 of each of the objects 372 may then be measured. Thereafter, the list is resorted, based on the distances from the recalculated center 382' of the new viewable area 380' to the center 384 of each of the objects 372. Furthermore, any un-received objects 372 are requested 616 from the web page host 150 in the order the un-received objects 372 are sorted in the list. The requests 602, 606, 612, 616 and the replies 604, 608, 614, 618, which correspond to the requests 102, 106, 112, 116 and replies 104, 108, 114, 118 may also comprise HTTP messages.

What is claimed is:

1. A mobile computing device comprising,
   processing components;
   memory components;
   an electronic display; and
   a web browser adapted to communicate with a web server by,
      requesting to receive a web page hosted by the web browser and comprising a plurality of objects,
      receiving a first portion of the plurality of objects in a first order;
      determining a section of the web page that is displayed on the electronic display;
      calculating a distance from a first location in the section of the web page that is displayed on the electronic display to a first location of each of the plurality of objects;
      creating a list of the plurality of objects based on the distance from the first location of the section of the web page that is displayed on the electronic display to the first location of each of the plurality of objects;
      storing the list in the memory components; and
      requesting to receive from the web server a second portion of objects in a second order corresponding to the list of the plurality of objects.

2. The mobile computing device of claim 1 wherein, creating a list of the plurality of objects based on the distance from the first location of the section of the web page that is displayed on the electronic display to the first location of each of the plurality of objects comprises ranking the plurality of objects based on the shortest distance from the first location of the section of the web page that is displayed on the electronic display to the first location of each of the plurality of objects.

3. The mobile computing device of claim 1, wherein,
   at least one of the second portion of objects comprises a dynamic object referencing at least one additional object; and
   the web browser is further adapted to communicate with the web server by,
      determining a first location of the at least one additional object;
      calculating a distance from the first location of the section of the web page that is displayed on the electronic display to the first location of at least one additional object;
      reprioritizing the plurality of objects including the at least one additional object based on their distance from the first location of the section of the web page that is displayed on the electronic display; and
      requesting to receive an un-received third portion of objects in an order based on the re-prioritizing the plurality of objects.

4. The mobile computing device of claim 1 wherein, the web browser is further adapted to update the list of the plurality of objects upon at least one of, determining the web page comprises additional objects; and changing the section of the web page that is displayed on the electronic display.

5. The mobile computing device of claim 4 wherein, upon updating the list of the plurality of objects, the web browser is further adapted to communicate with the web server by, requesting to receive any un-sent objects in an order corresponding to the updated list of the plurality of objects.

6. The mobile computing device of claim 1 wherein, the web browser is further adapted to communicate with the web server by, recalculating the distance from the first location of the section of the web page that is displayed on the electronic display to the first location of each of the plurality of objects upon changing the section of the web page that is displayed on the electronic display to a new section, wherein the new section at least partially comprises a separate portion of the web page than was displayed previously.

7. A non-transitory, tangible computer readable storage medium, encoded with processor readable instructions to perform a method of displaying content in a web page, the method comprising, requesting to view a web page comprising a plurality of objects;

receiving a first portion of the plurality of objects in a first order;

determining a viewable section of the web page;

calculating a center of the viewable section of the web page;

calculating a center of each of the plurality of objects;

calculating a distance from the center of the viewable section of the web page to the center of each of the plurality of objects;

prioritizing the plurality of objects based on the distance of the center of each of the plurality of objects from the center of the viewable section of the web page; and requesting to receive at least one additional portion of the plurality of objects in a second order based on the prioritization of the plurality of objects, the second order being different than the first order.

8. The non-transitory, tangible computer readable storage medium of claim 7 wherein, the at least one additional portion of the plurality of objects comprises a plurality of un-received objects; and requesting to receive at least one additional portion of objects comprises, requesting to receive an un-received object that is at least as close to the center of the viewable section of the web page as any other un-received object before requesting to receive any other un-received objects, and successively requesting to receive each next closest object to the center of the viewable section of the web page.

9. The non-transitory, tangible computer readable storage medium of claim 8 wherein, the requesting to receive at least one additional portion of objects further comprises, requesting to receive the at least one additional portion of objects based on at least one of object type and object content.

10. The non-transitory, tangible computer readable storage medium of claim 9 wherein, the object content comprises advertisements and the requesting to receive at least one additional portion of objects comprises requesting to receive advertisements last.

11. The non-transitory, tangible computer readable storage medium of claim 7 further comprising, receiving the at least one additional portion of the plurality of objects from a web page host in the second order, wherein at least one object from the at least one additional portion of the plurality of objects comprises a dynamic object.

12. The non-transitory, tangible computer readable storage medium of claim 7 wherein, the at least one additional portion of the plurality of objects comprises a second portion of the plurality of objects;

the dynamic object references one or more other objects; and further comprising, determining a center of the one or more other objects;

calculating a distance from the center of the viewable section of the web page to the center of the one or more other objects;

including the distance from the center of the viewable section of the web page to the center of the one or more other objects in a reprioritization of the plurality of objects based on the distance from the center of each of the plurality of objects to the center of the viewable section of the web page; and requesting to receive an un-received third portion of objects in an order based on the reprioritization of the plurality of objects.

13. The non-transitory, tangible computer readable storage medium of claim 7 further comprising, changing the viewable section of the webpage;

dynamically recalculating the distance from the center of the viewable section of the webpage to the center of each of the plurality of objects; and dynamically reprioritizing the remaining un-requested plurality of objects based on the distance of the center of each of the plurality of objects from the center of the viewable section of the web page.

14. The non-transitory, tangible computer readable storage medium of claim 13 wherein, the viewable section of the webpage is changed through at least one of scrolling, panning, zooming, and orientation change of the webpage.

15. The non-transitory, tangible computer readable storage medium of claim 7 wherein, receiving a first portion of the plurality of objects in a first order occurs substantially simultaneously as, determining a viewable section of the web page;

calculating a center of the viewable section of the web page;

calculating a center of each of the plurality of objects;

calculating a distance from the center of the viewable section of the web page to the center of each of the plurality of objects; and prioritizing the plurality of objects based on the distance of the center of each of the plurality of objects from the center of the viewable section of the web page.

16. The non-transitory, tangible computer readable storage medium of claim 7 wherein, requesting to view a web page comprises, sending a request from a web browser, and receiving the request at a web page host; and the at least one additional portion of objects comprises an un-received second portion of objects.

17. The non-transitory, tangible computer readable storage medium of claim 7 wherein, the first portion of the plurality of objects comprises a first object; and further comprising, building a document object model tree; and creating a render tree.

18. The non-transitory, tangible computer readable storage medium of claim 17 wherein, the first portion of the plurality of objects further comprises cascaded style sheets and javascript components.

19. The non-transitory, tangible computer readable storage medium of claim 17 further comprising, updating the document object model tree.

20. A method requesting objects from a web server comprising,
receiving a first portion of the objects from the web server;
determining a viewable area of a web page;
calculating a center of the viewable area;
measuring a distance from the center of the viewable area to a center of each of the objects;
creating a sortable list comprising the distance from the center of each of the objects to the center of the viewable area; and
requesting a second portion of the objects from the web server in the order of the sortable list.

21. The method of claim 20 wherein,
one of the second portion of the objects comprises an object having a shortest distance from the center of the viewable area to the center of the object;
the object having the shortest distance from the center of the viewable area to the center of the object comprises the first requested object from the second portion of the objects; and
the center of each object successively requested object from the second portion of the objects comprises a distance from the center of the viewable area that is one of greater than and an equal to the distance of the center of each previously requested object from the center of the viewable area.

22. The method of claim 20 further comprising,
changing the viewable area of the web page to a new viewable area;
calculating the center of the new viewable area;
measuring the distance from the center of the new viewable area to the center of each of the objects;
resorting the list based on the distances from the center of the new viewable area to the center of each of the objects;
requesting a third portion of objects from the web server in the order that the third portion of objects are sorted in the list; and
displaying the first, second and third portions of the plurality of viewable objects.

23. The method of claim 20 wherein, the objects are received in response to an http request.

* * * * *